March 1, 1932. J. D. WILSON ET AL 1,847,802
WINDSHIELD CLEANER
Filed April 22, 1929
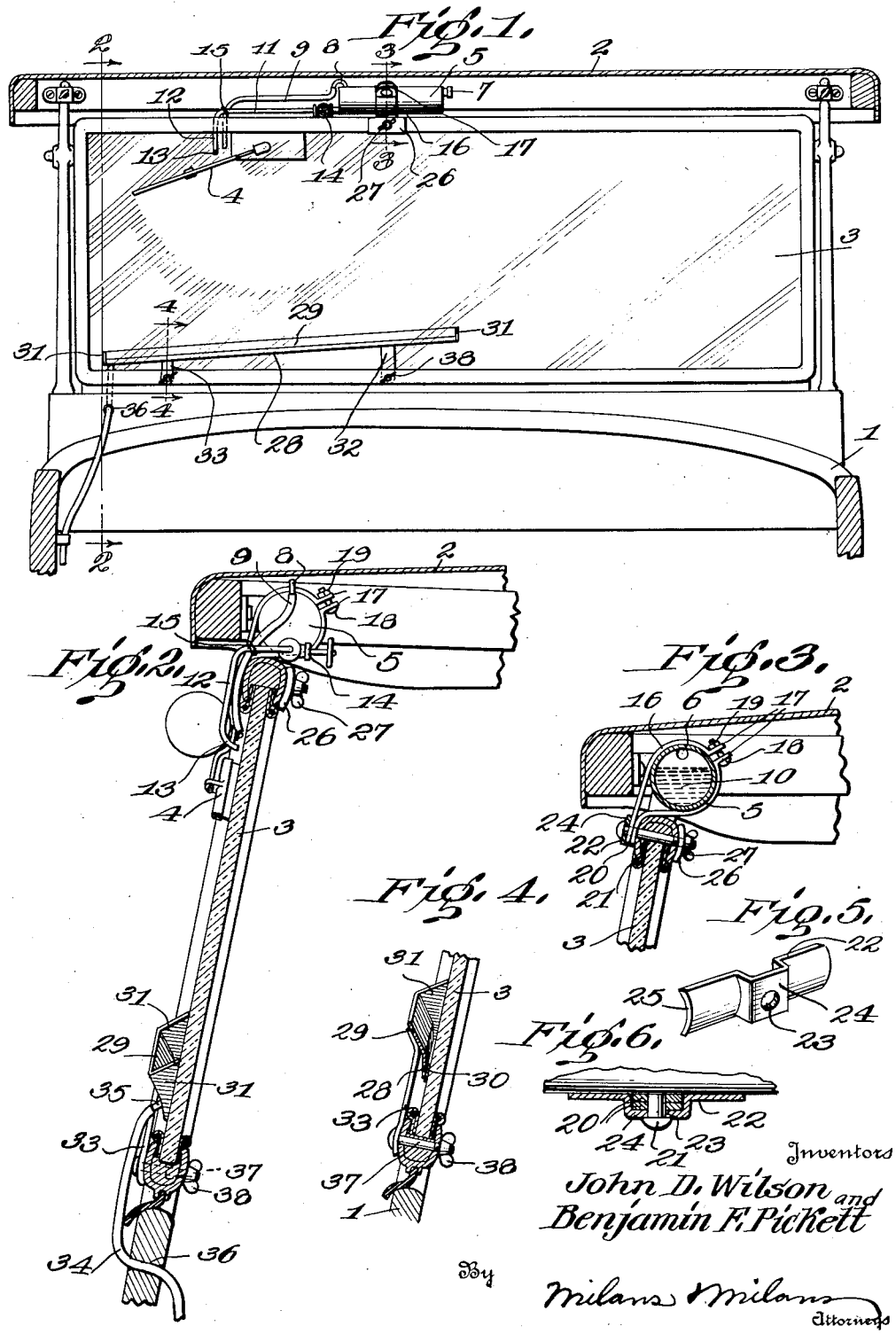
Inventors
John D. Wilson and
Benjamin F. Pickett
By Milans & Milans
Attorneys Patented Mar. 1, 1932

1,847,802

UNITED STATES PATENT OFFICE

JOHN DANIEL WILSON, OF BALLSTON, AND BENJAMIN FRANKLIN PICKETT, OF WYTHEVILLE, VIRGINIA

WINDSHIELD CLEANER

Application filed April 22, 1929. Serial No. 357,219.

Our invention relates to new and useful improvements in a device for cleaning glass or similar surfaces of ice, sleet, frost or the like, and for conveying the waste liquids to a suitable point of discharge, the device being primarily intended for use on windshields of automobiles, cars or the like.

The principal object of the invention resides in the provision of a device of the character described in which an attachment is provided for the windshield or the like adapted to be used in conjunction with any of the well-known types of windshield wipers, the attachment comprising a member or portion adapted to supply a liquid such as alcohol or glycerine to the surface to be cleaned within the active zone of the wiper, and a member or portion adapted for conveying the waste material to a suitable point for discharge.

A further object of the invention resides in the provision of a device of the character described including a receptacle adapted to contain a supply of the cleaning liquid, means for discharging such liquid in the form of drops to the surface to be cleaned, and a trough positioned to receive the waste material (including any surplus of the cleaning liquid as well as water caused by the melting of the ice, sleet or the like) and convey the same to a suitable point for discharge.

With the above and other objects in view, which will appear as the description proceeds, our invention consists in the novel details of construction, and arrangement of parts, described in the following specification and illustrated in the accompanying drawings, and while we have illustrated and described the preferred embodiments of the invention, as they now appear to us, it will be understood that such changes may be made as will fall within the scope of the appended claims:

In the drawings:—

Fig. 1 is a view looking in the direction towards the inner face of an automobile windshield.

Fig. 2 is a vertical section on the line 2—2 of Fig. 1 looking in the direction of the arrows.

Fig. 3 is a fragmental detail on the line 3—3 of Fig. 1 looking in the direction of the arrows.

Fig. 4 is a fragmental detail on the line 4—4 of Fig. 1 looking in the direction of the arrows.

Fig. 5 is a perspective of one of the clamping plates; and

Fig. 6 is a top plan of the clamping plate illustrated in Fig. 5 in use.

In the drawings 1 indicates a portion of the body, 2 a portion of the top, and 3 the windshield of an automobile of well-known construction, a windshield wiper, also of well-known construction, being shown at 4 and adapted for wiping or cleaning the portion of the outer surface of the windshield within reach of the swinging movement thereof. We have illustrated the windshield wiper as of the "automatic" type but we wish it understood that our invention will be equally as well adapted for use with the so-called "hand type" form of wiper.

In carrying out our invention an attachment is secured to the upper edge of the windshield for supplying a liquid such as alcohol or glycerine to the outer surface of the windshield and a trough-like member is secured adjacent the lower edge of the windshield to receive the drippings or waste material and to convey the same to a suitable point for discharge.

The attachment for the upper edge of the windshield, for supplying the liquid, consists of a tank 5, of the shape shown, and adapted to extend parallel with the upper edge of the windshield. The tank is formed in one end, adjacent the top, with a filling opening 6 which is normally closed by the cap 7 and at the opposite end a pipe 8 is connected at the top of the tank and communicates with the interior thereof, a rubber tube or the like 9 being connected to the outer end of the pipe and positioned as quite clearly shown in Fig. 1 of the drawings. Air will enter through the tube 9 and pipe 8 to create sufficient atmospheric pressure within the tank to allow the discharge of the liquid 10 through the pipe 11 which enters the end of the tank adjacent the bottom surface thereof, the opposite or outer end of the pipe 11 being turned downwardly as shown at 12 and then inwardly as shown at 13 to a point adjacent the outer surface of the windshield glass. A valve 14 is positioned in the pipe 11 and may be manipulated to allow the discharge of liquid or to cut off the discharge thereof through the pipe 11. In order to maintain the down turned end of the tube 9 in proper position we may attach the same to the pipe 11 by means of a ring or band 15. As shown the liquid will be discharged from the end 13 of the pipe 11 at a point above the wiper 4 and preferably will be discharged in the form of drops. As the vehicle is moved the liquid will naturally contact with the surface of the windshield, this being aided when the windshield is inclined as shown in Figs 2 and 3 of the drawings. The liquid will flow over the surface to be engaged by the wiper during its swinging movement. In other words the liquid is delivered within the active zone of the wiper. The tank 5 is secured to the upper edge of the windshield by means of the metallic strap 16 which is preferably formed in two parts. The upper ends of the strap sections are bent to form the ears or lugs 17 through which a bolt 18 passes as shown more particularly in Fig. 3 of the drawings. A nut 19 is received on the bolt 18 and may be manipulated to adjust the strap. The lower ends of the strap sections are overlapped as shown at 20 and a bolt 21 passes through the overlapped ends and through the windshield frame as shown. A clamping plate 22 is secured to the outer face of the windshield frame by means of the bolt 21 which passes through an opening 23 formed in an off-set 24 of the clamping plate. The off-set portion 24 overlies the overlapped ends of the strap as shown in Figs. 3 and 6 and the inner face of the plate is concaved as shown at 25 to properly engage the windshield frame. A clamping plate 26 is received on the bolt 21 and engages the inner face of the windshield frame. The clamping plate 26 is held in position by means of the wing nut 27, received on the bolt 21, which is manipulated to securely hold the clamping plates in position. As shown more particularly in Fig. 3 of the drawings the lower portion of the strap 16 is bent over the top of the windshield frame and this aids in preventing swinging movement of the tank. Movement of the tank is further prevented by the clamping plate 22 which has the off-set portion 24 to receive the overlapped ends 20 of the strap.

The trough which is positioned adjacent the lower horizontal edge of the windshield consists of a plate 28 which is bent as shown more particularly in Fig. 4 of the drawings to provide the outwardly flared upper portion 29. The lower edge of the plate is adapted to engage the surface of the windshield and if desired a packing strip 30 may be positioned between the windshield surface and the edge of the plate. At the ends the plate is formed with the right angle extensions which engage the windshield surface and due to the curvature of the plate and the formation of these end portions a trough-like member is provided. The plate is secured to the windshield frame by means of the lugs or straps 32 and 33, the lug or strap 32 being somewhat longer than the lug or strap 33 whereby the plate or trough-like member will assume an inclined position with its outer end positioned adjacent the side of the windshield. A rubber tube 34 is secured to the outer end of the trough-like member by means of the nipple 35 and the tube passes through an opening 36 formed in the body and is carried down to a suitable point for discharging the waste material through the floor board or similar part of the automobile. The straps or lugs 32 and 33 are secured to the windshield frame, as previously described, by means of the bolts 37 and wing nuts 38.

From the above detailed description it is thought that the construction of our device will be clearly understood. During the winter season considerable difficulty is experienced by operators of automobiles or like vehicles due to the formation of ice, or the accumulation of sleet or frost or the like on the windshield which prevents proper view by the operator. The ordinary form of windshield wiper ordinarily will not move this ice or sleet and it has been the custom to wipe various substances such as alcohol or glycerine on the outer face of the windshield. This will prevent the accumulation of ice and sleet for a time but has not been found entirely satisfactory. With our device drops of the liquid may be continually supplied to the surface of the windshield within the active zone of the wiper. In other words the liquid is supplied to the surface in position to be wiped thereover by the wiper. We wish to lay particular stress on the fact that our device is adapted for use with any of the well-known forms of wiper and eliminates the necessity of using any particular or specific type of wiper. The tank for supplying the liquid is secured to the windshield in a novel manner and sufficient air is allowed to enter the tank to permit the ready flow of the liquid therefrom when the control valve is open. The trough-like member is provided adjacent the lower edge of the windshield to receive any surplus of the cleaning liquid or the water caused by the melting of the ice or sleet. The trough-like member is of simple and inexpensive construction and is so attached to the windshield to direct the waste towards the outer end thereof from which it is conveyed to a suitable point of discharge. With our construction in the summer time when the use of the cleaning device is not necessary it may be removed and stored away for future use without disturbing in any way the wiper which remains on the windshield for use in rainy weather.

Having fully described our invention what we claim as new and desire to secure by Letters Patent is:—

1. A cleaning device for windshields comprising a receptacle, means for securing the same in place on an automobile, said receptacle having an outlet in its bottom portion a discharge pipe connected to said outlet, a manually controlled valve for said pipe, the receptacle also having a vent at the upper portion thereof and an elongated conduit connected therewith whereby fumes may be led to and discharged at a remote point relative to the receptacle substantially as and for the purpose described.

2. A cleaning device for windshields comprising a receptacle, means for securing the same in place on an automobile, said receptacle having an outlet in its bottom portion, a discharge pipe connected to said outlet, a manually controlled valve for said pipe, the receptacle also having a vent at the upper portion thereof and an elongated conduit connected therewith whereby fumes may be led to and discharged at a remote point relative to the receptacle, the outlet at the top of the receptacle and the elongated conduit being connected by an arched portion extending substantially above the receptacle to prevent flow of liquid from the receptacle to the conduit.

In testimony whereof we hereunto affix our signatures.

JOHN DANIEL WILSON.
BENJAMIN FRANKLIN PICKETT.